Figure 1:
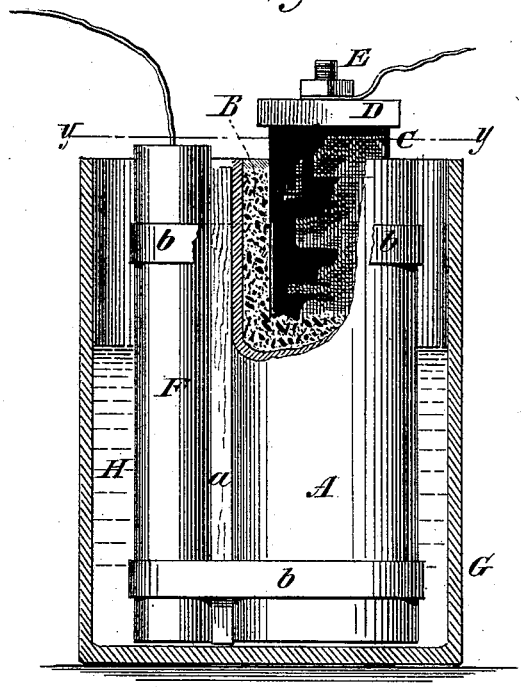

(No Model.)

C. D. PARKHURST.
GALVANIC BATTERY.

No. 269,454. Patented Dec. 19, 1882.

WITNESSES:
Gustave Dieterich
C. Sedgwick

INVENTOR:
C. D. Parkhurst
BY Munn &Co
ATTORNEYS.

N. PETERS, Photo-Lithographer, Washington, D. C.

UNITED STATES PATENT OFFICE.

CHARLES D. PARKHURST, OF PROVIDENCE, RHODE ISLAND, ASSIGNOR OF ONE-HALF TO LEWIS N. FREEMAN, OF ORD, NEBRASKA.

GALVANIC BATTERY.

SPECIFICATION forming part of Letters Patent No. 269,454, dated December 19, 1882.

Application filed May 5, 1882. (No model.)

*To all whom it may concern:*

Be it known that I, CHARLES DYER PARKHURST, of Providence, in the county of Providence and State of Rhode Island, have invented a new and Improved Galvanic Battery, of which the following is a full, clear, and exact description.

My improvement relates to the class of batteries in which a single fluid is used.

The object of the invention is to effect the rapid and complete depolarization of the negative plate, and thereby increase the efficiency of this class of batteries.

In my improved galvanic battery the positive plate is made of zinc, in any of the well-known shapes, and is provided with a wire conductor connected with it in the ordinary way. The negative plate, which is of carbon, of the kind commonly used in batteries, is placed in a porous cell and surrounded with a mixture of granulated gas-retort carbon, granulated black oxide of manganese, and mild chloride of mercury or calomel, equal parts. These materials are intimately mixed together with a small quantity of water before being placed around the negative plate. As the fluids of this battery, when in operation, are very corrosive, I saturate the upper end of the carbon with paraffine or wax, and make the electrical connection with it by casting lead or solder around it and attaching to it a binding-screw. The porous cell is filled around the carbon to within a short distance of the top of the cell with the mixture of gas-carbon, black oxide of manganese, and chloride of mercury, and the top of the cell is sealed with a cement of resin and wax, or any other insulating-cement insoluble in the fluid of the battery. Two small holes are left in the cement for the admission of water or the exciting-fluid, or for the escape of gas which may be generated in the porous cell.

The porous cell, containing the carbon plate, the granulated carbon, and black oxide of manganese, and the chloride of mercury, as above described, is placed in a suitable jar, together with a zinc rod or plate which has been amalgamated. The exciting-fluid is a saturated solution of ammonium chloride or sal-ammoniac. The shape of the jar is immaterial, although less evaporation of the water would follow from the use of a vessel having a narrow neck, in which the elements are fitted closely, the vessel being provided with a cover. As there are no deleterious fumes given off, this cover is not essential except as a preventer of evaporation and to prevent dust from accumulating in the cell. The character of the porous cell is also immaterial, provided it be of not too hard and impenetrable material. Parchment, cloth, parchment paper, as well as the porous cell as generally used, may be made use of to hold the mass of the depolarizer in its place about the carbon plate; or the use of a porous-cup may be entirely avoided by compacting the said mass of the depolarizer into any convenient form and fastening the same to the carbon plate, spaces being left at intervals between the mass and the plate by rubber bands. The zinc may also be fastened against a block of wood or of hard rubber and placed within the same bands, fastening all together in a compact form, thereby diminishing the distance between the two plates, and consequently reducing the internal resistance of the battery. The action of this battery is as follows: The zinc, calomel, carbon, and manganese being all insoluble in water, there is no internal action when the circuit is open. The circuit being closed, decomposition commences. The zinc is oxidized by the water of the sal-ammoniac solution forming oxide. This zinc oxide immediately reacts with the sal-ammoniac, (ammonium chloride,) first combining with a portion of the chlorine of the latter (and displacing an equivalent of ammonia) and then combining with another portion of the sal-ammoniac, forming ammonia zinc-chloride, while the ammoniac becomes converted into ammonia. The hydrogen, being liberated at the negative plate, unites with its equivalent of oxygen from the peroxide of manganese, reducing this to the sesquioxide, and by this union forming water. The ammonia reduces the calomel into metallic mercury and hydrochloric acid, which latter unites with the ammonia, forming ammonium chloride, to be decomposed, as above described, or this latter acid may act directly upon the zinc, thereby intensifying the action of the battery.

The reaction given above may not be at all times fully complete, and the double chlorides of zinc and ammonia may be formed, as well as double chlorides of mercury and ammonia; but the above shows the advantage of the use of the calomel, as by its use the ammonia, which previously was a waste product in this class of batteries, is made to play a part in intensifying the action of the battery, and render it practically a constant battery, fitted for any use where a constant current is required, as well as having it still a very desirable and economical form of battery for use with alarms or bells, or other forms of work where open circuit is the rule and closed circuit the exception, as in telephone service. Its small size renders it less cumbersome than many of the forms of battery now in use, while its greater electro-motive force renders it possible to reduce the number of cells and still have a given quantity of current.

Reference is to be had to the accompanying drawings, forming a part of this specification, in which similar letters of reference indicate corresponding parts in all the figures.

Figure 3:
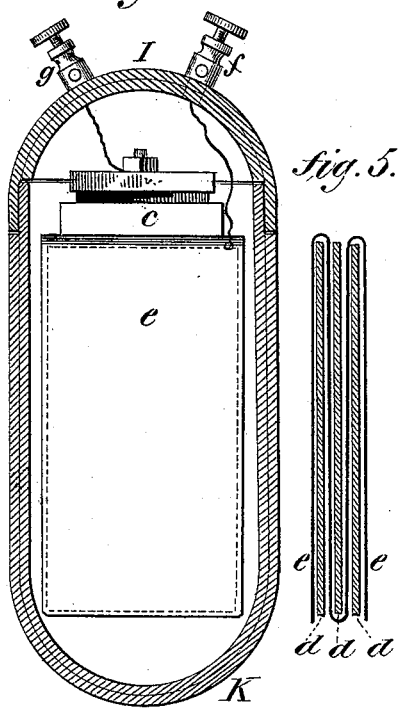
Figure 2:
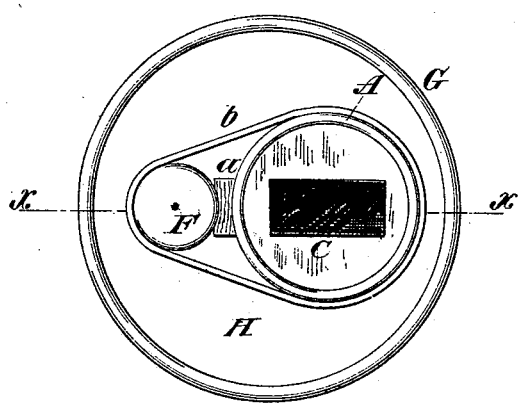

Figure 1 is a side elevation, partly in section, on line $x\,x$ in Fig. 2. Fig. 2 is a horizontal section taken on line $y\,y$ in Fig. 1. Fig. 3 is a vertical section, on line $z\,z$ in Fig. 4, of a moist pile form of my improved battery; and Fig. 5 is a vertical section of the same, taken on line $z'\,z'$ in Fig. 4.

In Figs. 1 and 2, A is the porous cell; B, the mixture of gas-retort carbon, black oxide of manganese, and chloride of mercury; C, the carbon plate, surrounded by the same; D, the lead or solder cap, cast on the upper end of the carbon; E, the binding-post. F is a rod of amalgamated zinc, separated from the porous cell by a strip, $a$, of insulating material, and clamped in position by rubber bands $b\,b$, encircling both zinc and porous cell. G is the battery-jar, containing the exciting-fluid H.

Figure 5:
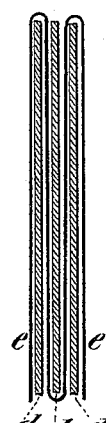
Figure 4:
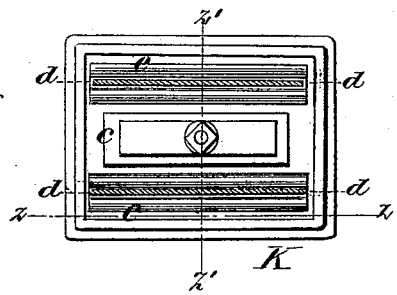

In the dry or moist pile form of the battery shown in Figs. 3, 4, and 5 the porous cell is replaced by a sack, $c$, of canvas or parchment, which is filled with the mixture of carbon, black oxide of manganese, and chloride of mercury, and sealed, as in the case of the battery with a porous cell. The zinc plates $d$ in this case are wrapped in blotting-paper $e$, as shown in Fig. 5, and placed upon opposite sides of the sack $c$. The zinc plates are connected by a wire with the binding-post $f$, and the carbon plate is connected by a wire with the binding-post $g$, both binding-posts being secured in the cover I of the case K, which incloses all of the parts of the battery. This case may be made of leather, rubber, or other suitable material.

The exciting-fluid is a saturated solution of chloride of ammonium, which is absorbed by the blotting-paper surrounding the zinc plates, and by the canvas sack and its contents. This battery contains no free solution, and may therefore be carried in the pocket without inconvenience.

I may in some cases employ only granulated carbon with the chloride of mercury as a depolarizer. In other cases I may use only granulated black oxide of manganese in connection with the chloride of mercury, and as an exciting-fluid I may employ chloride of ammonium, chloride of lime, or water simply, or chloride of sodium. Therefore I do not limit or confine my invention to the precise form herein described.

Having thus described my invention, I claim as new and desire to secure by Letters Patent—

1. In a galvanic battery, a depolarizing medium consisting of a mixture of carbon, black oxide of manganese, and chloride of mercury, as herein specified.

2. In a galvanic battery employing a granulated depolarizing agent and a chloride exciting-solution, the combination of chloride of mercury with the granulated depolarizer, as herein specified.

3. In a galvanic battery, the combination, with the closed case K, provided with the binding-posts $f\,g$, of the canvas sack $c$, containing the carbon plate and the polarizing mixture, and the zinc plates $d$, wrapped in blotting-paper and arranged on opposite sides of the sack, substantially as described, and for the purpose set forth.

CHARLES D. PARKHURST.

Witnesses:
FRANK BOULTER,
W. S. SCHUYLER.